United States Patent [19]
Takahashi

[11] Patent Number: 5,964,158
[45] Date of Patent: Oct. 12, 1999

[54] MAGNETIC INK CHARACTER DETECTION APPARATUS AND CONTROLLING METHOD THEREFORE

[75] Inventor: Eizo Takahashi, Suwa, Japan

[73] Assignee: Seiko Epson Corporation, Tokyo, Japan

[21] Appl. No.: 08/752,783

[22] Filed: Nov. 20, 1996

[30] Foreign Application Priority Data

Nov. 20, 1995 [JP] Japan .................................. 7-301721

[51] Int. Cl.⁶ .................................................. B41F 1/54
[52] U.S. Cl. ........................... 101/484; 101/227; 101/228
[58] Field of Search .................................. 101/227, 228, 101/219, 484

[56] References Cited

U.S. PATENT DOCUMENTS 5,458,062  10/1995  Goldberg ................................ 101/227
5,551,786   9/1996  Webster ................................. 400/659

FOREIGN PATENT DOCUMENTS

3066      1/1985  Japan ..................................... 101/227
2-35582   2/1990  Japan ..................................... 101/227
90-35582  2/1990  Japan ..................................... 101/227

*Primary Examiner*—Edgar Burr
*Assistant Examiner*—Charles H. Nolan, Jr.
*Attorney, Agent, or Firm*—Michael T. Gabrik

[57] ABSTRACT

An apparatus and control method therefor which compensates differences among individual media in detected signal amplitudes caused by imperfect magnetic ink character printing conditions without requiring an adjustment of amplitude of a received signal amplifier. Preferably, the magnetic ink character detection apparatus of the present invention includes a moving device that moves the magnetic head and/or the medium relative to each other at a predetermined speed; an amplitude detection unit for detecting the amplitude and/or saturation amount of the electrical signals output from the magnetic head; and a moving-speed determination unit for determining the relative moving speed caused by the moving device in accordance with the output from the amplitude detection unit.

17 Claims, 7 Drawing Sheets

MAGNETIC INK CHARACTER DETECTION APPARATUS AND CONTROLLING METHOD THEREFORE

BACKGROUND OF THE INVENTION

1. Field of the Invention

This invention relates to techniques for detecting magnetic ink characters on documents and recognizing them. In particular, the invention relates to the technology of suppressing fluctuations in magnetic ink character detection signals caused by suboptimal printing of magnetic ink characters.

2. Description of the Related Art

Figure 9:
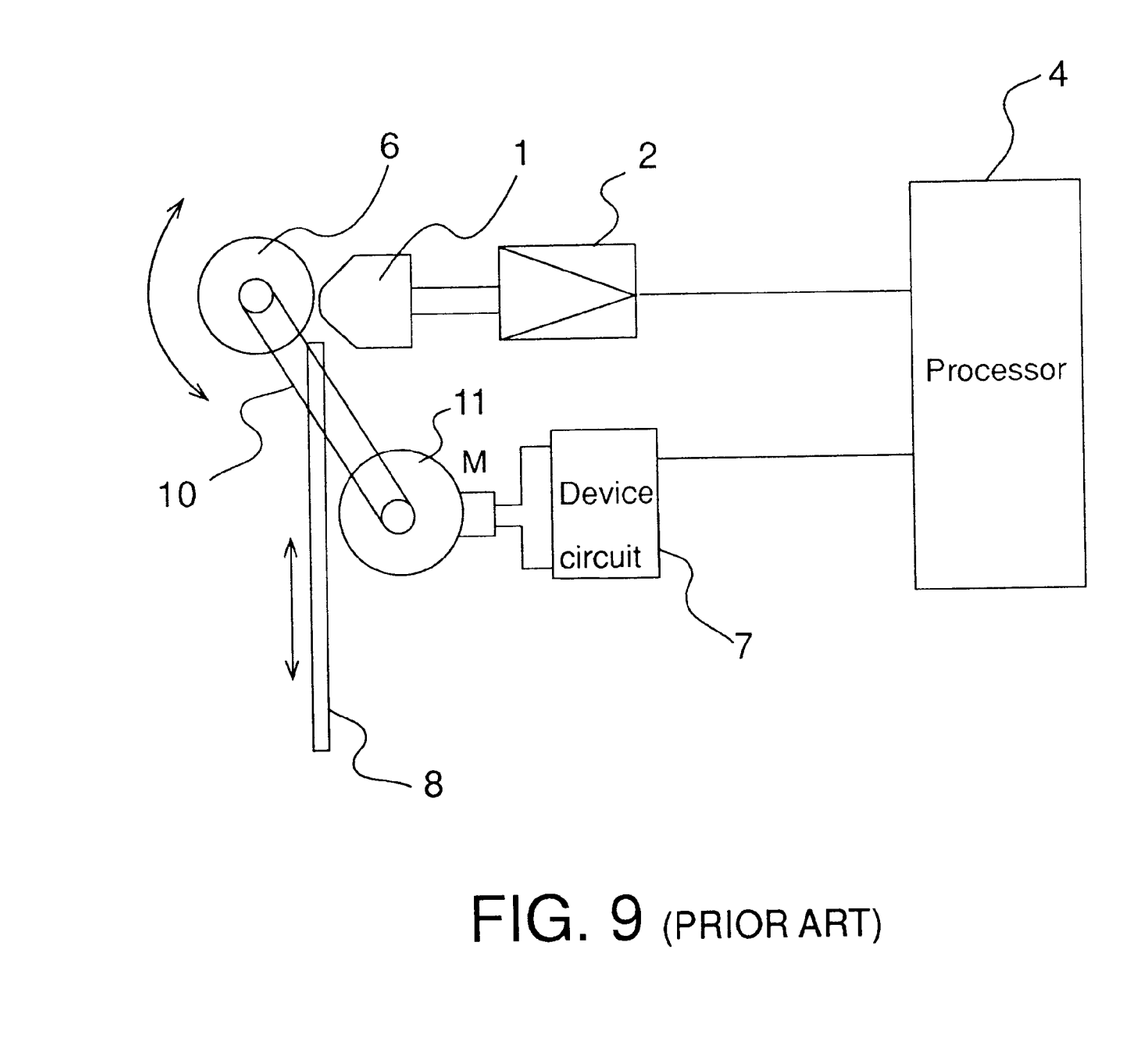
FIG. 9 shows a schematic view of a conventional magnetic ink character detection apparatus.

FIG. 9 shows a schematic view of a conventional magnetic ink character detection apparatus. In FIG. 9, magnetic head 1 is used as a magnetic signal detection unit, and a DC motor 11 is used as a drive source for transporting the medium on which magnetic ink characters are printed. The medium is transported by a transport mechanism composed of a transmission belt 10 and a rubber roller 6. When a magnetic ink character printed on the medium passes over magnetic head 1, magnetic head 1 converts the magnetic flux generated by the magnetic ink character into an electrical signal.

Generally, the scanning height for a magnetic head is provided in the direction in which the medium is transported. The scanning height is designed to be wider than the height of the magnetic ink characters. Prior to the detection processing, the magnetic ink characters are remagnetized to a specified polarity. This causes the magnetic head to output an electrical signal converted from a magnetic flux representing a change in the height component (also referred to as the vertical component) of a given magnetic ink character.

Figure 5:
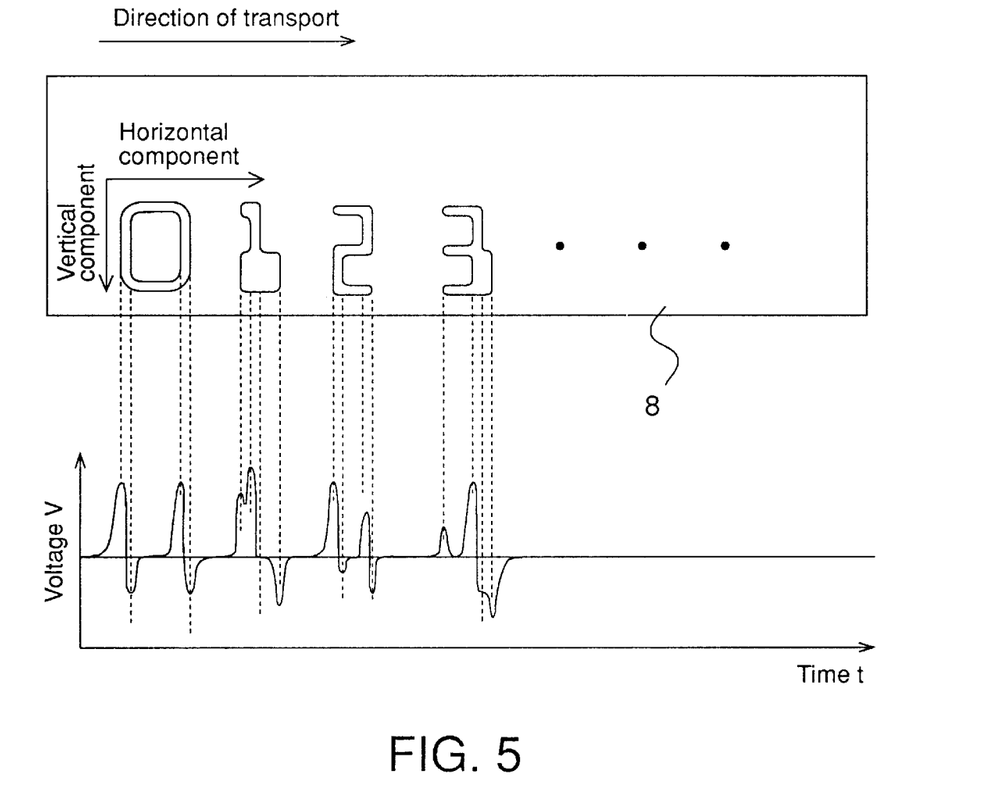
FIG. 5 shows an example medium on which magnetic ink characters are printed, and the signal waveforms that are generated when the medium is read by a magnetic head.

The shapes of magnetic ink characters are standardized under ISO/R1004, so that fixed electrical signal waveforms are produced by a predetermined transport speed of the medium. FIG. 5 shows an example of magnetic ink characters that are printed on medium 8. Magnetic ink characters may be printed in either of two fonts: E13B and CMC7. The font shown in the FIG. 5 is E13B. The signal waveform shown in the lower portion of the figure represents a change as a function of time of the electrical signals that are output from amplification circuit 2, wherein the magnetic ink character detection apparatus reads the medium in FIG. 5 from "0" to "3".

As the signal waveform indicates, the signal shows a positive peak based on a change in the vertical component of a magnetic ink character, at the local maximum of the change ratio in the vertical component. Similarly, the signal shows a negative peak at the local minimum of the change ratio in the vertical component. The magnitude of a peak depends upon the rate of increase or decrease of the vertical component.

When detecting a magnetic ink character by transporting a medium, the apparatus first amplifies the electrical signals that have been output by the magnetic signal detection unit, detects the positive and negative peaks, and then it determines the peak positions on the time axis. The apparatus can detect a magnetic ink character by determining that the positive peak position of the first waveform as the beginning of a given character, and by detecting the presence or absence of the positive and negative peaks of waveforms at a fixed interval that is determined by the transport speed of the medium.

When a magnetic ink character has been detected, the character is recognized by the positions at which the positive peaks and the negative peaks of the signal waveforms that are associated with the characters have been pre-stored as pattern data. The pattern data associated with magnetic ink characters are synchronized with specific starting positions on the basis of detected signal waveforms, and the magnetic ink characters are recognized by referencing the pattern data.

In the related art described above, however, in cases where the conditions under which magnetic ink characters are printed in different conditions between one medium and another, the positive and negative peak values of the electrical signals that are output from the magnetic signal detector can vary from one medium to another. Specifically, if the magnetic ink contains a high concentration of a magnetic material, or the character height is substantially increased because of an increase in the width of lines composing the characters due to print smudging (hereinafter referred to as a "positive scattering"), the signal peaks that are output by the magnetic head increase. Conversely, if the concentration of magnetic material is low or the character height is substantially decreased due to a decrease in line width (hereinafter referred to as a "negative scattering"), the signal peaks that are output by the magnetic head decrease.

Figure 6:
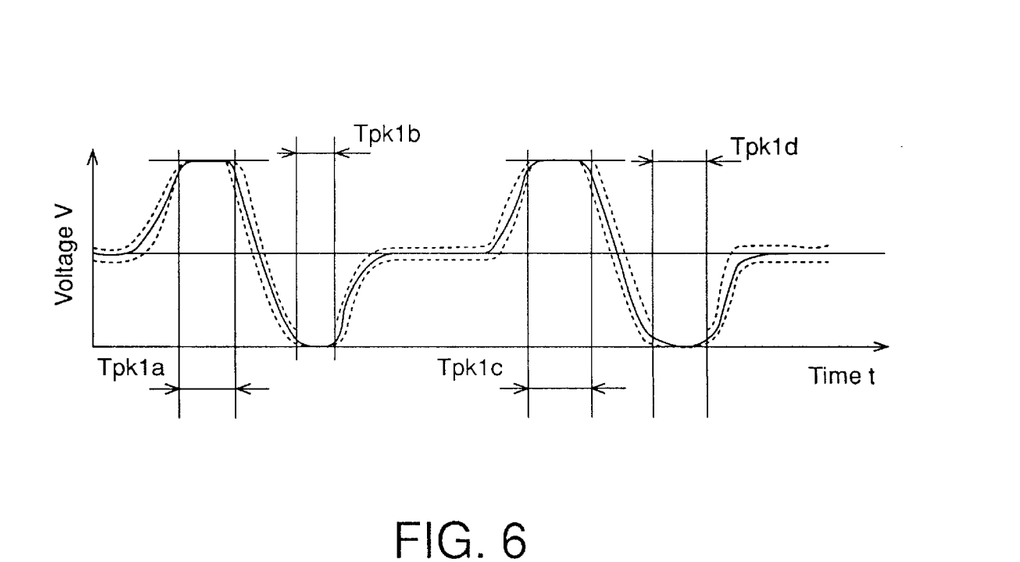
FIG. 6 shows signal waveforms that are generated when the medium undergoes an increase in scattering.

If the magnetic ink characters that are printed exhibit a positive scattering, the electrical signals that are output are amplified to a greater amplitude by the succeeding amplification circuit. If the amplified electrical signal, after amplification, is greater than the maximum output voltage of the amplification circuit, i.e., if the electrical signal exceeds the dynamic range of the amplification circuit, the electrical signal waveform exhibits a saturation state as shown in FIG. 6. In the figure, the area indicated by Tpk1a, Tpk1b, Tpk1c and Tpk1d represent a saturated area. Thus, a problem in the related art is that in a saturated condition, the position at which the peak of a waveform occurs can be indeterminate.

Figure 7:
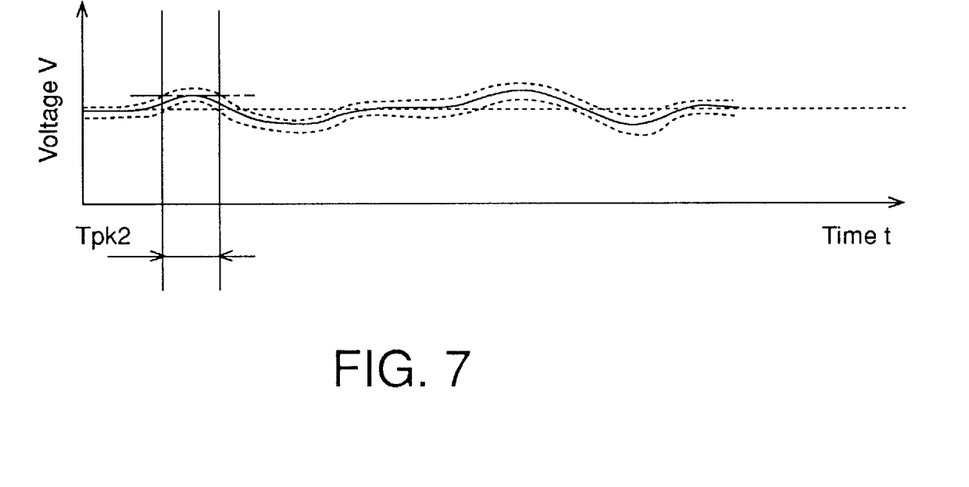
FIG. 7 shows signal waveforms that are generated when the medium undergoes a decrease in scattering.
Figure 8:
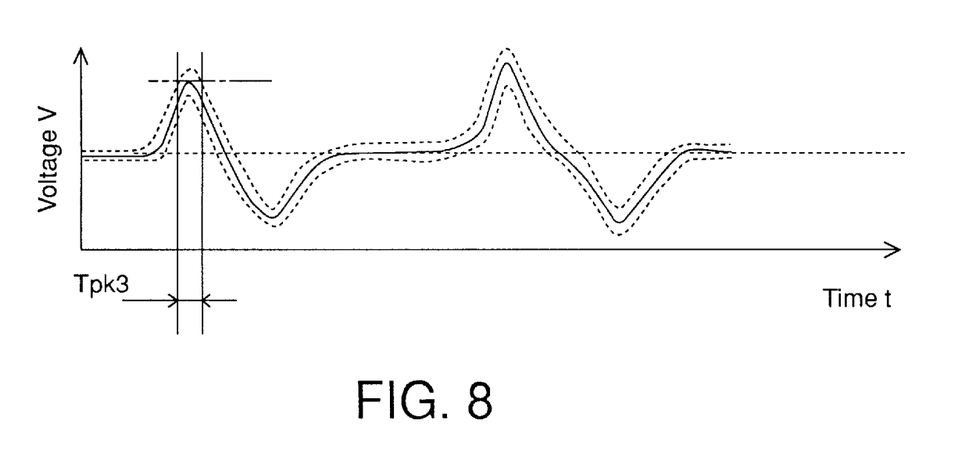
FIG. 8 shows signal waveforms with optimal signal amplitudes after a speed correction according to the present invention.

By contrast, if a printed magnetic ink character scatters negatively, the signal that is output from the magnetic head decreases. Consequently, the signal amplitude that is output by the amplification circuit also decreases, as shown in FIG. 7. As indicated by the broken lines in FIG. 7, normally a signal waveform contains an overlapping external noise, such as magnetic noise. Therefore, if the position of a peak in the signal waveform is detected by using a conventional peak detection method, the peak detection position fluctuates in the range indicated by Tpk2 in FIG. 7.

Therefore, in the aforementioned conventional recognition method that uses peak positions of the detection signals for the recognition of characters, the inability to accurately determine peak positions results in an decrease in the recognition probability of magnetic ink characters.

OBJECTS OF THE INVENTION

Therefore, it is an object of the present invention to improve the accuracy of magnetic ink character recognition during the presence of positive and negative scattering conditions. More specifically, an object of the present invention is to detect magnetic ink characters in a stable manner without requiring an adjustment to the amplitude of the amplification circuit.

Another object of the present invention is to enhance the probability of recognition of magnetic ink characters even under printing conditions that vary from one medium to another causing the amplitude of magnetic ink character detection signals to vary from one medium to another.

SUMMARY OF THE INVENTION

To achieve these and related objects, the magnetic ink character detection apparatus of the present invention includes a moving device that moves the magnetic head and the medium relative to each other at a prescribed speed; an amplitude detection unit that detects the amplitude and/or saturation of the electrical signals output from the magnetic head; and a moving-speed determination unit that determines the relative moving speed caused by the moving device in response to the output from the amplitude detection circuit.

If the amplitude detected by the amplitude detection unit is small, the amplitude of the electrical signal detected from the magnetic head can be increased by increasing the relative moving speed produced by the moving device. Similarly, if the saturation of electrical signals is detected by the amplitude detection unit, the saturation of electrical signals can be prevented in the successive trial by setting the lower relative moving speed that is produced by the moving device.

In this case, it is preferable that the moving speed determination unit comprises a speed change magnitude determination device that determines the magnitude of change in speed that corresponds with the amplitude and/or saturation amount of the electrical signals that are detected by the amplitude detection unit; and a speed update device that determines the moving speed based upon the current moving speed settings and upon the magnitude of change in speed that has been determined by the speed change magnitude determination device.

In this case, it is even more desirable that the amplitude detection unit comprises in part an analog to digital conversion circuit that converts into digital values the electrical signals that are output from the magnetic head, and that this portion of the amplitude detection unit outputs the amplitude and/or saturation amount of electrical signals as digital values. Moreover, it is desirable that the speed change magnitude determination includes a conversion table memory that stores a conversion table for converting the amplitude and/or saturation amount of electrical signals into the speed change magnitude.

The present invention described above may also be recognized as a computer-implemented method of controlling a magnetic ink character detection apparatus. The control method described below can provide remarkable effects as an application of the above mentioned present invention. Specifically, the control method comprises a first moving process that moves the magnetic head and a medium at a prescribed speed relative to each other; an amplitude detection process that detects the amplitude and/or saturation amount of the electrical signals that are output from the magnetic head; a moving-speed determination process that determines the relative-moving speed in the moving process according to the detection results from the amplitude detection process; a second moving process that resets the relative positions of the magnetic head and the medium to the initial condition, namely the condition before the execution of the first process; and a third moving process that moves, relative to each other, the magnetic head and the medium at the relative-moving speed that was determined by the moving-speed determination process.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts

DESCRIPTION OF THE PREFERRED EMBODIMENTS

Figure 1:
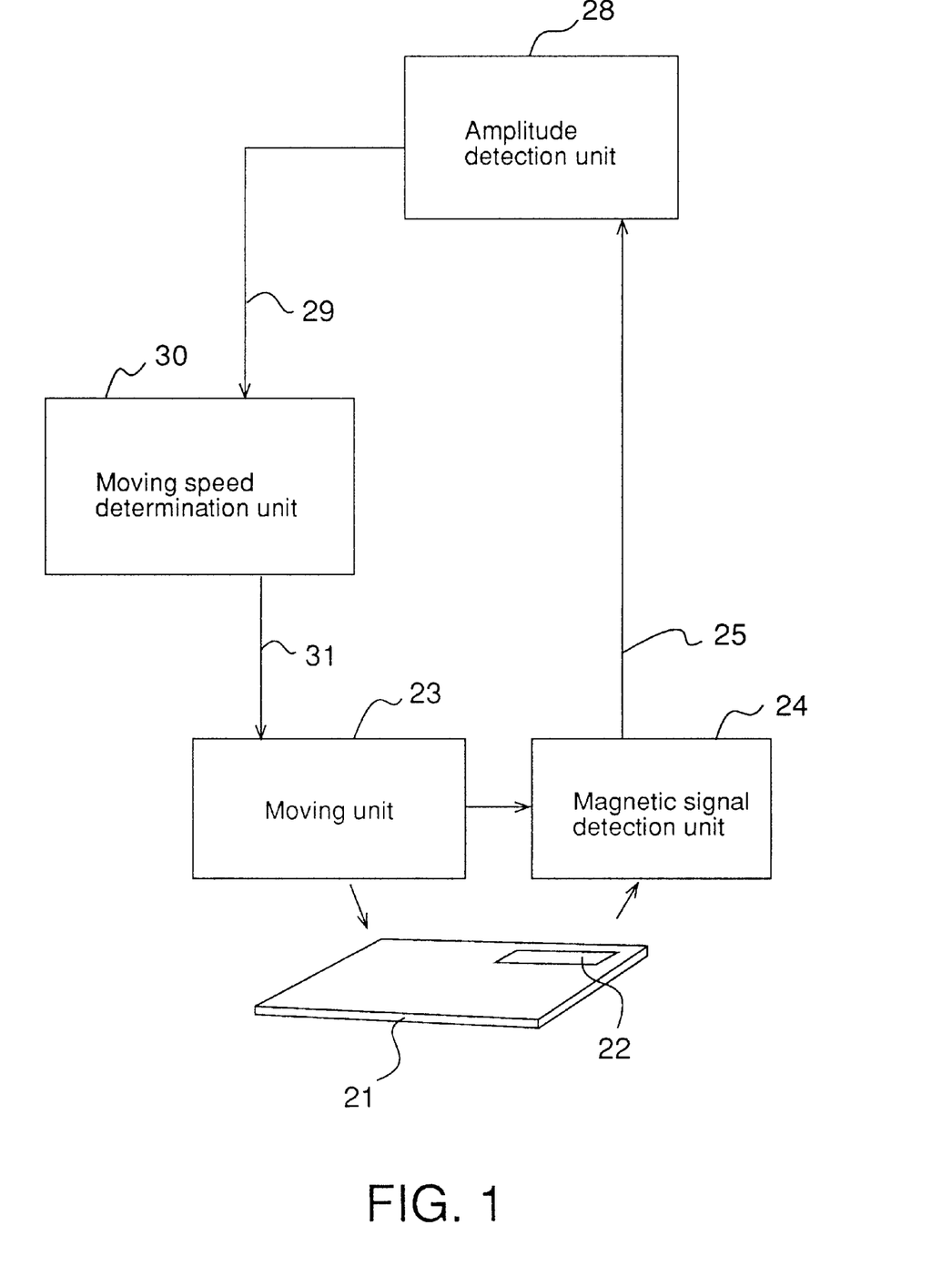
FIG. 1 shows a block diagram that depicts the underlying technological philosophy of the magnetic ink character detection apparatus of the present invention.

FIG. 1 is a block diagram that shows the underlying technological philosophy of the present invention. Medium 21, on which magnetic ink characters 22 are printed, and magnetic signal detection unit 24 are moved relative to each other by moving unit 23. The speed at which the objects are moved by moving means 23 is set by moving-speed determination unit 30 to be described hereinbelow. While moving relative to medium 21, magnetic signal detection unit 24 converts the magnetic signals detected from magnetic ink characters 22 into electrical signals 25, and transmits them to the amplitude detection unit 28. Amplitude detection unit 28 detects the amplitude of electrical signals 25, i.e., peak values, and transmits amplitude information 29 to moving speed determination unit 30. It should be noted that, preferably amplitude-detection unit 28 also detects whether electrical signals 25 are in a saturated state, and preferably it transmits information 29 to the moving speed determination unit. Based upon both information 29 regarding amplitudes and the current moving speed, moving-speed determination unit 30 determines a new moving speed.

Of course, the new moving speed is set so that at that moving speed, electrical signal 25 will have an appropriate amplitude. Thus, when electrical signal 25 is in a saturated state, a slower moving speed is specified to allow for the extent of the saturation. When the amplitude of electrical signal 25 is smaller than a specified value, a faster moving speed is specified based upon the extent to which the amplitude is smaller.

Moving speed 31, determined by moving-speed determination unit 30, is transmitted to moving unit 23. Then, as described above, moving unit 23 relatively moves medium 21, on which magnetic ink characters 22 are printed, against magnetic signal detection unit 24 according to the moving speed 31 that has previously been determined.

Figure 2:
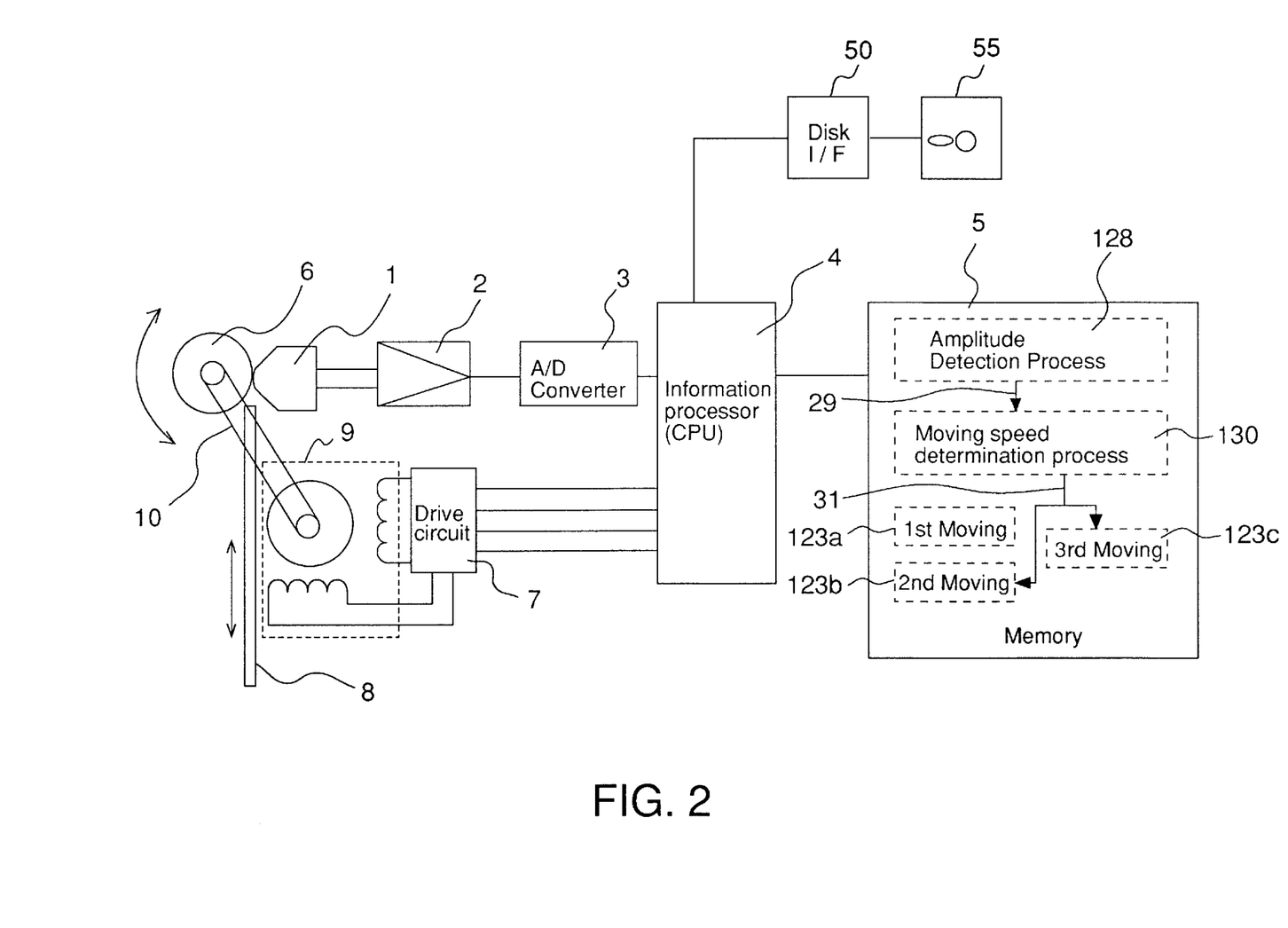
FIG. 2 shows a schematic view of first embodiment of the magnetic ink character detection apparatus according to the present invention.

FIG. 2 shows a schematic view of the first preferred embodiment. Medium 8, on which magnetic ink characters are printed, is transported by rubber roller 6. Rubber roller 6 is driven by stepping motor 9 through transmission belt 10.

The material of which rubber roller 6 is made is by no means limited to rubber; any known material having an appropriate friction coefficient relative to the material of the magnetic ink character recording carrier, e.g., personal check, may be used. This example uses stepping motor 9 as a drive source for the transport mechanism. By rotating the motor either in the positive direction or in reverse, the medium can be moved either forward or backward.

Stepping motor 9 is a so-called hybrid motor, which is controlled by an information processor (hereinafter referred to as "CPU 4") through drive circuit 7. Four signal wires are connected from CPU 4 each corresponding to the driving coils in the stepping motor to drive circuit 7 so that the motor can be operated in 2 phases or in 1–2 phases. The signal waveforms that travel through the signal wires when driving stepping motor 9 are well known to the art; therefore, a more detailed description thereof is omitted herein.

Magnetic head 1, which is an example of magnetic signal detection unit, converts the magnetic ink characters that are printed on medium 8 into electrical signals. Because magnetic head 1 is well known to the art, a detailed description thereof is also omitted herein. The signals, after being converted, are amplified into larger amplitudes. It should be noted here that amplification unit 2 may be omitted if the amplitudes of the output signals from magnetic head 1 are large enough. However, because the output from magnetic head 1 generally constitutes a current, the currents should be converted to voltages in order to accommodate the signal processing required in subsequent steps. At fixed sampling intervals, the amplified electrical signals are discretized by A/D conversion circuit 3 and are stored in memory circuit 5 by CPU 4. Therefore, the sampled values of signal waveforms are stored in memory circuit 5 in the order in which they were sampled.

The preferred control method executed by the CPU 4 generally comprises a first moving process 123*a* that moves the magnetic head 1 and the medium 8 at a prescribed speed relative to each other; an amplitude detection process 128 that detects the amplitude and/or saturation amount of the electrical signals that are output from the magnetic head 1; a moving-speed determination process 130 that determines the relative-moving speed in the moving process according to the detection results 29 from the amplitude detection process 128; a second moving process 123*b* responsive to the moving speed determination process 130 that resets the relative positions of the magnetic head 1, and the medium 8 to the initial condition, namely the condition before the execution of the first moving process 123*a*; and a third moving process 123*c* that moves, relative to each other, the magnetic head 1 and the medium 8 at the relative-moving speed that was determined by the moving-speed determination process 130.

It should be noted here that components of this invention, namely the amplitude detection process 128, the moving speed determination process 130, and the first (123*a*). second (123*b*) and third (123*c*) moving processes shown in FIG. 2 may be conveniently implemented using an information processor such as CPU 4 (FIGS. 2, 4) programmed according to the teachings of the present disclosure, as will be apparent to those ordinarily skilled in the computer arts. Appropriate software coding can be readily prepared based on the teachings of the present disclosure, as will be apparent to those ordinarily skilled in the software arts. The present invention may also be implemented by the preparation of application specific integrated circuits ("ASICS") or by interconnecting an appropriate network of conventional component devices and circuits, as will be readily apparent to those ordinarily skilled in the electronics arts.

Figure 4:
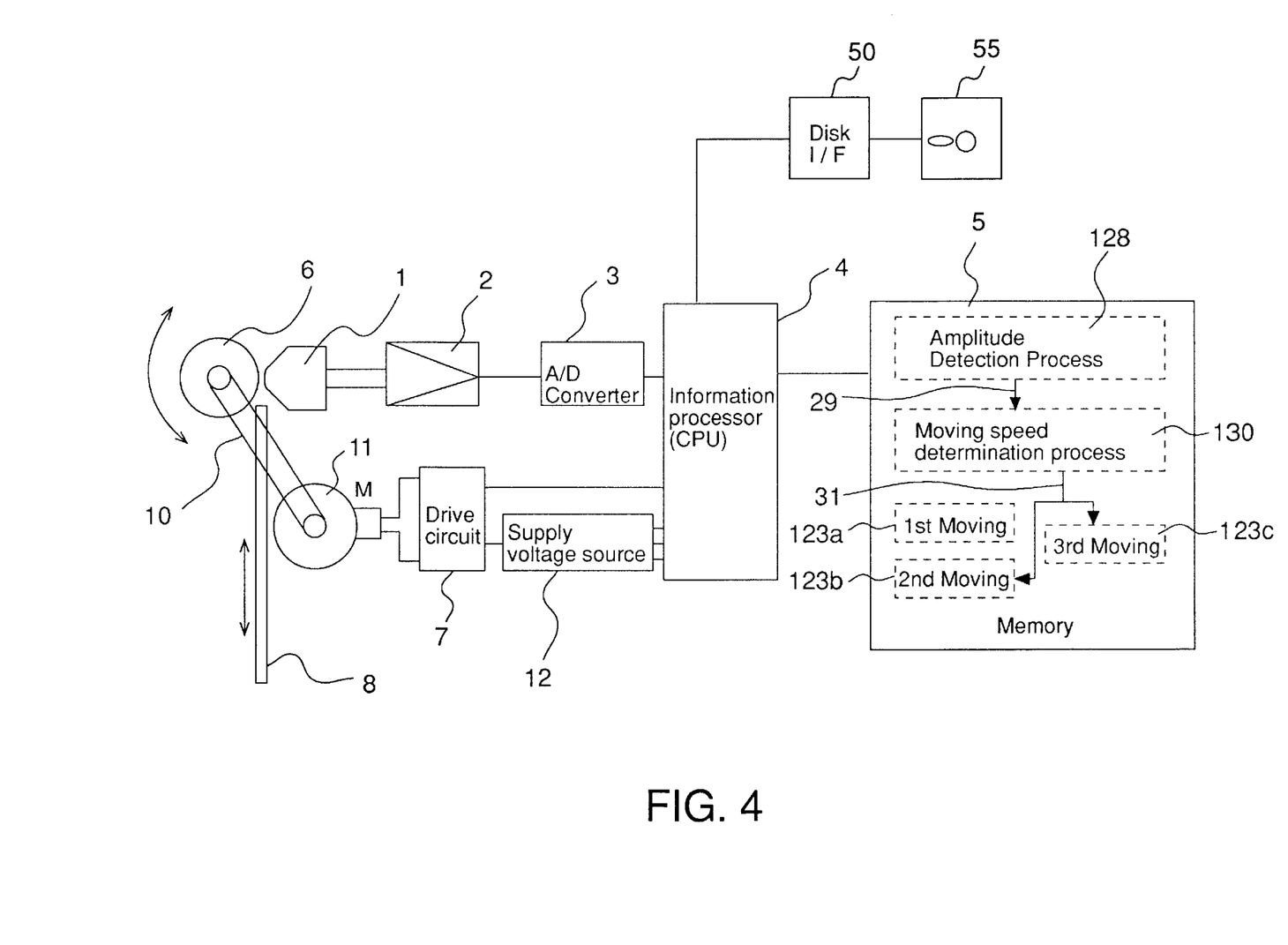
FIG. 4 shows a schematic view of a second embodiment of the magnetic ink character detection apparatus according to the present invention.

In each of the preferred embodiments of the present invention described herein, the amplitude detection process 128, the moving speed determination process 130 and the first (123*a*), second (123*b*) and third (123*c*) moving processes take the form of either independent or interdependent threads or processes executed by CPU 4 as shown in FIGS. 2 and 4 (discussed in more detail hereinbelow). These threads permit media speed adjustment and compensation processes to be carried out according to the present invention when CPU reads and executes their corresponding programming instructions from a computer readable storage medium. Although here CPU 4 reads programming instructions corresponding to amplitude detection process 28, moving speed determination process 130, and the first (123*a*), second (123*b*) and third (123*c*) moving processes from memory circuit 5 principally composed of RAM, it should be recognized that the teachings of the present invention are not so limited, and that storage medium may include any type of disk media, removable or fixed, local to CPU 4 or remotely accessible through an intermediary device or network. Such disk media may include floppy disks (e.g. floppy disk 55 readable by CPU 4 through conventional disk interface 50), optical disks such as CD-ROMs and DVD articles, hard drives or disk arrays, whether physically located within or external to CPU 4. Of course, as preferred, the storage medium can comprise a solid state memory such as ROM, RAM, EPROM, EEPROM, Flash EEPROM or any combination thereof, as long as it is capable of storing the necessary programmed instructions and can be accessed by CPU 4.

The following is a description of the operation of the present embodiment using a flowchart (FIG. 3) that indicates the control sequence of the aforementioned processes employed in the present embodiment as executed by CPU 4. First, operation that occurs when the magnetic ink characters printed on medium 8 have a positive scattering will be described. In step S1, CPU 4 sets the pulse rate for stepping motor 9, i.e., the step rate, to a default value (first moving process 123*a*), and then it initiates transporting the medium. In step S2, medium 8 is transported. The waveforms of the electrical signals that are generated from the magnetic ink characters printed on medium 8 are stored in memory circuit 5 by the aforementioned processing with reference to FIG. 1 discussed above.

The waveforms are stored, based upon the numerical values that are stored in memory circuit 5 (assuming the detected signals in determination S3 exceed known thresholds, indicating they are mostly character information rather than noise.) In step S4, CPU 4 checks to see whether there are any saturated profiles within the signal waveforms, as shown, for example, in FIG. 6. This processing will be described in more detail hereinbelow. The testing in step S4 is performed by differentiating the set of numerical values. Because sampled values are employed in this embodiment, the testing process calculates the differences between successive sample values. If saturation points exist, the derivative becomes 0 in the neighborhood of a local maximum or a minimum point. The testing process examines if two or more such points are detected. And, if three or more points having zero derivatives within a single local maximum or minimum are detected in the sets of numerical values representing the waveform, the occurrence of saturation may be concluded with a relatively high degree of certainty (steps S3 and S4 together constitute the amplitude detection process 128).

Figure 3:
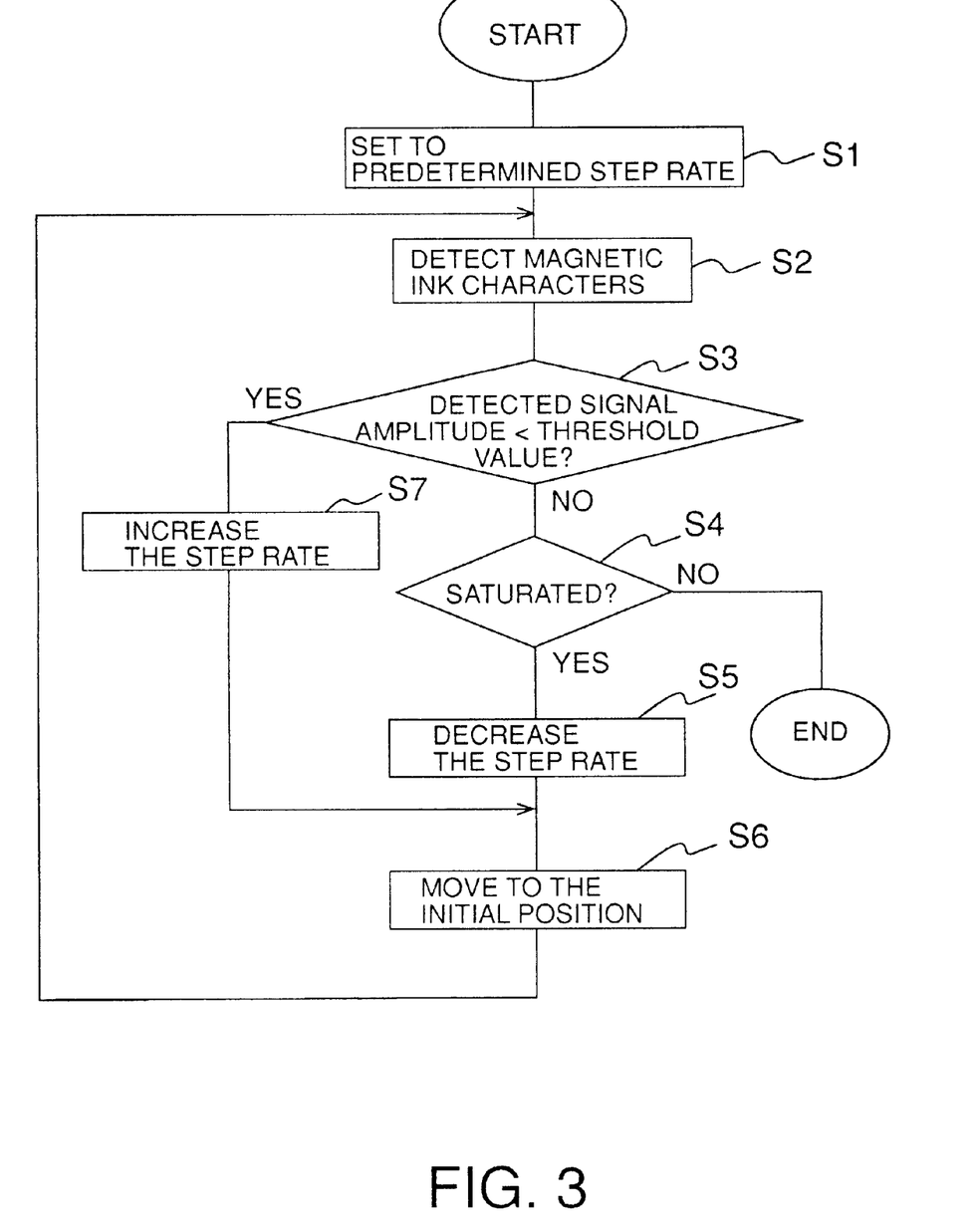
FIG. 3 shows a flowchart depicting the operation of the first embodiment of the magnetic ink character detection apparatus according to the present invention.

When saturation points are detected in this manner, in step S5 (i.e. moving speed determination process 130), CPU 4 sets the pulse rate, i.e., the step rate, for stepping motor 9 to a value lower than the value used the present trial. To accomplish this, first the CPU extracts the saturation point having the greatest width among all the saturation points that are found. This is done, for example, by selecting the saturation area having the greatest number of sampling points having zero derivatives with the neighboring sampling points. Then, the CPU determines either the absolute value or the ratio of the step rate that is to be reduced according to the number of the maximum sampled points included in a single saturation area. And, finally, the CPU changes the previous step rate in terms of the absolute value or the ratio. Because the magnitude of a peak value generally increases in proportion to the transport speed of the media, step rates should preferably be changed by using the ratio value rather than the absolute value.

For determining the magnitude of change in speed described above, the relationship between the sample points and the magnitude or ratio or change should be stored in memory, such as in ROM, in the form of a table. This scheme permits the rapid setting of new transport speeds.

Upon completion of the step rate setting process in step S5, in step S6 the CPU 4 runs the motor in reverse to operate the transport mechanism in reverse so that medium 8 is returned to the beginning-of-read position (i.e. second moving process 123b). Subsequently, in step S2, according to the step rate that has been set, CPU 4 transmits control signals to drive circuit 7, and by again transporting the medium, causes magnetic head 1 to detect magnetic ink characters (i.e. third moving process 123c). If favorable signal amplitudes are not obtained in this process, the CPU may successively repeat the above processing steps.

By contrast, in the case of a negative scattering, the waveforms obtained from medium 8 assume the forms shown, for example, in FIG. 7. As noted previously, when the amplitude, i.e., the peak, of the output waveform from the amplifier is small, as indicated in FIG. 7, the effects of overlapping noise produces an error in peak position by the width indicated by Tpk2. This prevents an accurate determination of the peak position. Therefore, the CPU sets a predetermined threshold level, and, in step S3, it compares each of the peak value of a waveform with the threshold level. If the maximum peak value is less than the threshold level, in step S7, CPU 4 sets the pulse rate for stepping motor 9 at a level higher than the pulse rate used during the previous test run, and it performs another detection with the increased transport speed of medium 8 (steps S6 and S2).

In step S7, the CPU extracts sampling points that are nearest the threshold level. The CPU then determines either the absolute value or the ratio by which the step rate must be increased according to the wave heights of the sample points. The CPU then changes the previous step rate by using this value. As noted previously, the relationship between sample point wave heights and step rate correction values should be prepared in memory as a table.

FIG. 4 depicts a second preferred embodiment of the present invention. DC motor 11 is used as a drive source for the transport mechanism shown in FIG. 2. A supply voltage source 12 is provided for supplying a specified drive voltage to DC motor 11. Supply voltage source 12 is organized in such a manner that the voltage to be applied to DC motor 11 can be varied. Changing the applied voltage changes the transport speed of the medium. In FIG. 4, three control wires are connected from CPU 4 to the supply voltage source 12 so that the supplied voltage can be varied in three steps. Because voltage sources with a variable output voltage are well known to the art, a description thereof is omitted herein. The simplest configuration may be a combination of a D/A converter and a voltage follower as is known to those ordinarily skilled in the art.

The operation of this embodiment is similar to those of the aforementioned examples, and accordingly does not require a detailed description herein. The important point, however, is the substitution of supplied voltage change for step rate change and similar processing adjustments. As in the aforementioned operation of the first embodiment, if the printed magnetic ink characters exhibit a positive scattering, CPU 4 sets a low supplied voltage in the supply voltage source 12 and reruns the test. This reduces the voltage supplied to DC motor 11, and consequently reduces the transport speed for medium 8. This permits the reduction of the positive and negative peak values obtained from medium 8 to an extent that the peak values do not saturate. On the other hand, if medium 8 exhibits a negative scattering, CPU 4 increases the supplied voltage from supply voltage source 12. By increasing the transport speed of medium 8 in this manner, the CPU can increase the positive and negative peak values produced to a level greater than a specified value.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A magnetic ink character detection apparatus for detecting magnetic ink characters disposed on a medium, comprising:

a magnetic signal detection unit in communication with the medium to detect a magnetic signal caused by movement therebetween and convert the detected magnetic signal into an electrical signal;

a moving unit to move at least one of said magnetic signal detection unit and the medium relative thereto at a selectable speed;

an amplitude detection unit having means for comparing an amplitude of the electrical signal generated by said magnetic signal detection unit with a threshold value and means for checking whether the electrical signal is in a saturated state; and a moving speed determination unit to redetermine the selectable speed of the relative movement between said magnetic signal detection unit and the medium responsive to the detection results of said amplitude detection unit;

wherein said moving speed determination unit increases the speed of the relative movement when said amplitude detection unit detects that the amplitude of the electrical signal is less than the threshold value, and decreases the speed of the relative movement when said amplitude detection unit detects that the electrical signal is in a saturated state.

2. The magnetic ink character detection apparatus of claim 1, wherein said moving unit comprises:

a transport roller for transporting the medium through frictional engagement therewith;

a motor for rotationally driving said transport roller; and a motor drive circuit communicating with said moving speed determination unit for driving said motor.

3. The magnetic ink character detection apparatus of claim 2, wherein said motor comprises a stepping motor; and said moving speed determination unit comprises a step-rate determination means for determining the step rate of a plurality of drive signals sent to said stepping motor by said motor drive circuit.

4. The magnetic ink character detection apparatus of claim 2, wherein said motor comprises a direct-current motor; and said moving speed determination unit comprises a drive voltage determination means for determining the drive voltage applied to said direct-current motor by said motor circuit.

5. The magnetic ink character detection apparatus of claim 1, wherein said moving speed determination unit comprises:

speed change magnitude determination means for determining a magnitude of change in the selectable speed based on the amplitude and saturation state of the electrical signal determined by said amplitude detection unit; and speed update means for redetermining the selectable speed based upon both a current moving speed and the magnitude of change in selectable speed determined by said speed change magnitude determination means.

6. The magnetic ink character detection apparatus according to claim 5, further comprising a digital conversion circuit for digitizing the electrical signal generated by said magnetic signal detection unit and wherein the electrical signal compared and checked by said amplitude detection unit is a digital electrical signal; and said speed change magnitude determination means comprises conversion table storage means for storing a conversion table containing the relationship between the amplitude and saturation state of the digital electrical signal and the magnitude of change in the selectable speed.

7. A method of controlling a magnetic ink character detection apparatus having a magnetic signal detection unit for detecting and converting a magnetic signal representative of magnetic characters disposed on a medium into an electrical signal, comprising the steps of:

(a) moving at least one of the magnetic signal detection unit and the medium relative therebetween at a selectable speed;

(b) detecting the amplitude of the electrical signal generated by the magnetic signal detection unit;

(c) comparing the amplitude of the electrical signal with a threshold value;

(d) checking whether the electrical signal is in a saturated state if the detected amplitude is not less than said threshold value in step (c);

(e) increasing the speed of the relative movement between said magnetic signal detection unit and the medium and repeating steps (a)–(c) when the detected amplitude is less than said threshold value in step (c); and (f) decreasing the speed of the relative movement between said magnetic signal detection unit and the medium and repeating steps (a), (b) and (d) when the electrical signal is in a saturated state in step (d).

8. The control method of claim 7, wherein said adjusting step comprises the steps of:

determining the magnitude of change in the selectable speed in accordance with the at least one of the amplitude and saturation state of the electrical signals detected in said detecting step; and determining a revised selectable speed based upon both current selectable speed settings and the magnitude of change in the selectable speed determined in said speed change magnitude determining step.

9. A method of controlling a magnetic ink character detection apparatus having a magnetic signal detection unit for detecting and converting a magnetic signal representative of magnetic characters disposed on a medium into an electrical signal, comprising the steps of:

(a) moving at least one of the magnetic signal detection unit and the medium relative therebetween at a selectable speed;

(b) detecting the amplitude of the electrical signal generated by the magnetic signal detection unit (c) comparing the amplitude of the electrical signal with a threshold value;

(d) checking whether the electrical signal is in a saturated state if the detected amplitude is not less than said threshold value in step (c);

(e) determining the magnitude of change in the selectable speed in accordance with the results obtained in steps (c) and (d);

(f) determining a revised selectable speed based upon both current selectable speed settings and the magnitude of change in the selectable speed determined in step (e);

(g) resetting the relative positions of the magnetic signal detection unit and said medium to an initial setting which existed prior to step (a); and (h) adjusting the selectable speed in accordance with the results obtained in steps (c) and (d).

10. An article of manufacture, comprising a computer usable medium having computer readable program code embodied therein for controlling a magnetic ink character detection apparatus having a magnetic signal detection unit for detecting and converting a magnetic signal representative of magnetic characters disposed on a magnetized medium into an electrical signal, the computer readable program code comprising:

(a) computer readable program code for moving at least one of the magnetic signal detection unit and the magnetized medium relative therebetween at a selectable speed;

(b) computer readable program code for detecting the amplitude of the electrical signal generated by the magnetic signal detection unit;

(c) computer readable program code for comparing the amplitude of the electrical signal with a threshold value;

(d) computer readable program code for checking whether the electrical signal is in a saturated state if the detected amplitude is not less than said threshold value in step (c);

(e) computer readable program code for increasing the speed of the relative movement between said magnetic signal detection unit and the medium and for repeating steps (a)–(c) when the detected amplitude is less than said threshold value in step (c); and (f) computer readable progam code for decreasing the speed of the relative movement between said magnetic signal detection unit and the medium and for repeating steps (a), (b) and (d) when the delectrical signal is in a saturated state in step (d)).

11. The article of claim 10, wherein said adjusting code comprises:
   computer readable program code for determining the magnitude of change in the selectable speed in accordance with the at least one of the amplitude and saturation state of the electrical signals detected by said detecting code; and
   computer readable program code for determining a revised selectable speed based upon both current selectable speed settings and the magnitude of change in the selectable speed determined by said speed change magnitude determining code.

12. An article of manufacture, comprising a computer usable medium having computer readable code embodied therein for controlling a magnetic ink character detection apparatus having a magnetic signal detection unit for detecting and converting a magnetic signal representative of magnetic characters disposed on a medium into an electrical signal, comprising:
   (a) computer readable program code for moving at least one of the magnetic signal detection unit and the medium relative therebetween at a selectable speed;
   (b) computer readable program code for detecting the amplitude of the electrical signal detection unit;
   (c) computer readable program code for comparing the amplitude of the electrical signal with a threshold value;
   (d) computer readable program code for checking whether the electrical signal is in a saturated state if the detected amplitude is not less than said threshold value in step (c);
   (e) computer readable program code for determining the magnitude of change in the selectable speed in accordance with the results obtained by said comparing and checking program code in steps (c) and (d);
   (f) computer readable program code for determining a revised selectable speed based upon both current selectable speed settings and the magnitude of change in the selectable speed determined by said speed change magnitude determining program code in step (e);
   (g) computer readable program code for resetting the relative positions of the magnetic signal detection unit and said medium to an initial setting; and
   (h) computer readable program code for adjusting the selectable speed in accordance with the results obtained by said comparing and checking program code in steps (c) and (d).

13. A magnetic ink character detection apparatus for detecting magnetic ink characters disposed on a medium, comprising:
   a magnetic head in communication with the medium to detect a magnetic signal caused by movement therebetween and convert the detected magnetic signal into an electrical signal;
   a motor and a transport roller driven by the motor to move at least one of said magnetic head and the medium relative thereto;
   a motor driver which drives said motor at a selectable speed;
   an amplitude detection unit having means for comparing an amplitude of the electrical signal generated by said magnetic signal detection unit with a threshold value and means for checking whether the electrical signal is in a saturated state; and
   a moving speed determination unit to redetermine the selectable speed of the relative movement between said magnetic head and the medium responsive to the detection results of said amplitude detection unit;
   wherein said moving speed determination unit increases the speed of the relative movement when said amplitude detection unit detects that the amplitude of the electrical signal is less than the threshold value, and decreases the speed of the relative movement when said amplitude detection unit detects that the electrical signal is in a saturated state.

14. The magnetic ink character detection apparatus of claim 13, wherein said motor comprises a stepping motor; and
   said moving speed determination unit comprises a step-rate determination unit which determines the step rate of a plurality of drive signals sent to said stepping motor by said motor driver.

15. The magnetic ink character detection apparatus of claim 13, wherein said motor comprises a direct-current motor; and
   said moving speed determination unit comprises a drive voltage determination unit which determines the drive voltage applied to said direct-current motor by said motor driver.

16. The magnetic ink character detection apparatus of claim 13, wherein said moving speed determination unit comprises:
   a speed change magnitude determination unit which determines a magnitude of change in the selectable speed based on the amplitude and saturation state of the electrical signal determined by said amplitude detection unit; and
   a speed update unit which redetermines the selectable speed based upon both a current moving speed and the magnitude of change in selectable speed determined by said speed change magnitude determination unit.

17. The magnetic ink character detection apparatus according to claim 16, further comprising a digital converter which digitizes the electrical signal generated by said magnetic head and wherein the electrical signal compared and checked by said amplitude detection unit is a digital electrical signal; and
   wherein said speed change magnitude determination unit comprises a conversion table memory which stores a conversion table containing the relationship between the amplitude and saturation state of the digital electrical signal and the magnitude of change in the selectable speed.

* * * * *

UNITED STATES PATENT AND TRADEMARK OFFICE
CERTIFICATE OF CORRECTION

PATENT NO.     : 5,964,158
DATED          : October 12, 1999
INVENTOR(S)    : Eizo Takahashi It is certified that errors appear in the above identified patent and that said Letters Patent is hereby corrected as shown below:

Column 9, line 14, insert --drive-- after "motor".

Column 9, line 62 – column 10, line 6, delete claim 8.

Column 11, line 1 – line 12, delete claim 11.

Column 11, line 24, insert --generated by the magnetic signal-- after "electrical signal".

Signed and Sealed this

Thirtieth Day of May, 2000

Q. TODD DICKINSON

*Attest:*

*Attesting Officer*            *Director of Patents and Trademarks*